Patented Apr. 4, 1950

2,502,432

UNITED STATES PATENT OFFICE 2,502,432

PROCESS FOR THE PRODUCTION OF DIENE HYDROCARBONS

John W. Copenhaver and Donald E. Sargent, Easton, Pa., assignors to General Aniline & Film Corporation, New York, N. Y., a corporation of Delaware No Drawing. Application November 15, 1945, Serial No. 628,984

9 Claims. (Cl. 260—681)

The present invention relates to the synthesis of butadiene and other conjugated diene hydrocarbons from methyl vinyl ether and related compounds.

The present invention is particularly valuable for the production of butadiene and other conjugated diene hydrocarbons from compounds represented by the following general formula:

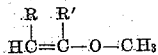

in which R and R' stand for a member of the group consisting of hydrogen, alkyl, aryl and aralkyl radicals.

While it has been proposed to prepare butadiene from ethyl vinyl ether by passing the vaporized ether over alumina at 360–460° C., it has heretofore been supposed that this reaction was unique with ethyl vinyl ether. We have now discovered, however, that butadiene and other conjugated diene hydrocarbons can be obtained in good yields from methyl-ethylenically unsaturated ethers.

Briefly stated, the present invention comprises heating the vapors of a methyl-ethylenically unsaturated ether, of the type specified above, to a temperature between 200° C. and 700° C. for a sufficient period of time to cause the ether to undergo a rearrangement and dehydration to convert the same to a conjugated diene hydrocarbon of the type:

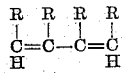

wherein the R's stand for hydrogen, alkyl, aryl or aralkyl radicals. The yields of conjugated diene hydrocarbons which are obtained can be substantially increased by contacting the heated vapors with a catalyst known to be active in dehydration and rearrangement reactions. We have also discovered that the yield of conjugated diene hydrocarbon which is obtained is substantially improved if the vaporized ether is diluted with a substantial amount, preferably at least an equivalent amount, of a vaporous or gaseous diluent during its contact with the catalyst.

The ethylenically unsaturated ethers which may readily be converted into conjugated diene hydrocarbons in accordance with the present invention are exemplified by the vinyl, aralkyl vinyl or aryl vinyl ethers of methyl alcohol, such as methyl-vinyl, propenyl, isopropenyl or butenyl ether, also the methyl ethers of α-phenyl vinyl alcohol and β-phenyl vinyl alcohol. It should also be understood that in place of the vinyl ethers we may employ substances which are derived therefrom by the addition of groups to the ethylene double bond which, under the conditions of reaction, are readily removed so as to again yield the corresponding vinyl ether. Thus, compounds of the type

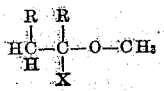

wherein R is defined as above, and wherein X represents, for example, alkoxy, aryloxy, aralkoxy, halogen or hydroxy, or an ester thereof, such as —SO₃H, —OSO₂H, —ONO, —ONO₂, —OCOR and the like, which may readily be removed, together with a hydrogen on the β-carbon atom as HX so as to produce the corresponding vinyl ether, may be characterized as "potential" vinyl ethers and, in the present application, are included as the equivalent of vinyl ethers. They may be exemplified by the following compounds: acetals, β-alkoxy butyrals, α-halogen atoms and the like. It should also be understood that mixtures of 2 or more methyl vinyl ethers or of a methyl vinyl ether and a potential methyl vinyl ether may advantageously be treated in accordance with the present invention for the production of diene hydrocarbon.

The methyl-ethylenically unsaturated ethers, such as those mentioned in the preceding paragraph, are vaporized and preferably mixed with a vaporous diluent. We have found that improved results are obtained when employing a wide variety of vaporous diluents and have used such substances as water, benzene, acetic acid, carbon dioxide, nitrogen and other organic and inorganic vapors or gases which are inert under the conditions of the reaction. In addition, we have employed as the diluent in practicing the present invention, the vapors of various alcohols, particularly the lower aliphatic alcohols, methanol and ethanol. Such alcohols appear to function both as inert diluents and, in addition, possibly enter into the reaction to a limited extent, since the use of alcohols, particularly ethanol and, to a lesser extent, slightly higher aliphatic alcohols, propanol, butanol and the like, influence the type of product which is obtained. In the production of butadiene from ethyl vinyl ether and other alkyl vinyl ethers, we have found that particularly good yields are obtained when ethyl alcohol is employed as the diluent. We have also found that slightly smaller amounts of ethyl alcohol can be employed as the diluent to obtain improved results than are necessary when other diluents are used. In general, the ratio of diluent to vinyl ether which we prefer to use will be in the range of 1:1 to 10:1, the optimum range for any particular diluent and vinyl ether and other reaction conditions being determinable by experiment.

The process of the present invention is catalyzed by a wide variety of catalysts and all catalysts which are known to be active in dehydration and rearrangement reactions and which are solid at the temperature of reaction or which are deposited on solid carriers are suitable for use in the production of butadiene from vinyl ethers. Such diverse catalysts as the oxides, sulfides, carbonates, hydroxides, silicates, phosphates, halides, etc., of elements chosen from the group which consists of aluminum, molybdenum, tungsten, thorium, magnesium, calcium, boron, silicon, titanium, vanadium, chromium, manganese, iron, cobalt, nickel, copper, zinc, zirconium, silver, cadmium, etc., and in addition, such materials as acidic clays, kieselguhr, glass beads, silica gel, graphite, carbon, Carborundum, pumice, activated charcoal, diatomaceous earth, fuller's earth, etc., have been employed in this conversion. In general, we have found that the catalysts which are useful for the production of butadiene from acetaldehyde and ethyl alcohol are operable in our process. Particularly good yields have been obtained with aluminum oxide, 10% tungstic oxide on aluminum oxide, 10% molybdenum sulfide on aluminum oxide, 10% zinc oxide on aluminum oxide, and certain acidic or acid-washed clays. It should be understood that one or more of the above materials may be employed under a variety of conditions including mixtures, etc.

The reaction may be carried out through a wide temperature range and the process is operable between 200° C. and 700° C. However, in order to ensure a relatively rapid reaction rate, a temperature of at least 350° C. is preferred and temperatures above 550° C. are generally not preferred since their use may create some difficulties in the reaction, such as some decomposition of desired products. The preferred temperature range is, therefore, from 350° C. to 550° C.

The present invention may advantageously be practiced at atmospheric pressure. However, the pressure employed does not appear to be highly critical and higher or lower pressures have been employed without noticeable adverse effects.

The time of contact between the vinyl ether and the catalyst does not appear to be highly critical. Contact times of from 1 second to approximately 1 minute have been employed and have been found to be satisfactory. In commercial operations, a contact time of from 1 to 10 seconds will probably be preferred; however, shorter or longer times may be employed if desired.

The following specific examples illustrate the practice of the present invention:

*Example 1*

Two hundred thirty-two parts of methyl vinyl ether was passed over 200 parts of 4 mm. glass beads at a temperature of 510–595° C. and a contact time of 23 seconds. The reaction products were condensed in a series of ice-cooled and Dry-Ice methanol cooled traps and subjected to fractional distillation in an efficient still. Butadiene was isolated in the fraction boiling at −5° C. to +5° C. and identified as the tetrabromo derivative, M. P. 116–117° C. A mixed melting point with an authentic sample showed no depression of the melting point.

*Example 2*

A mixture of 156 parts of methyl vinyl ether and 310 parts of ethanol was vaporized and passed over 50 parts of activated aluminum oxide at 436–446° C. with a contact time of 1.7 seconds. The reaction products were condensed and separated by distillation in an efficient still, yielding 24.5 parts of butadiene.

We claim:

1. A process of producing conjugated diene hydrocarbons which comprises contacting in vapor phase and in the absence of added olefine an ethylenically unsaturated ether of the type

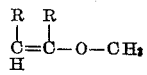

in which each of the R's stands for a member of the group consisting of hydrogen and alkyl, aryl and aralkyl radicals, with a dehydration catalyst at a temperature of from 350° C. to 550° C.

2. A process as defined in claim 1 in which said ether is mixed with a gaseous diluent during contact with said catalyst.

3. A process as defined in claim 1 in which said catalyst is activated alumina and said ether is mixed with a gaseous diluent during contact therewith.

4. A process as defined in claim 1 in which said ether is mixed with ethanol during contact with said catalyst.

5. A method of producing butadiene which comprises contacting in vapor phase and in the absence of added olefine methyl-vinyl ether with a dehydration catalyst at a temperature of from 350° to 550° C.

6. A process as defined in claim 5 in which the methyl-vinyl ether is mixed with a gaseous diluent during content with said catalyst.

7. A process as defined in claim 5 in which the catalyst is activated alumina and said ether is mixed with a gaseous diluent during contact therewith.

8. A process as defined in claim 5 in which said methyl-vinyl ether is mixed with ethanol during contact with said catalyst.

9. A process as defined in claim 5 in which the catalyst is activated alumina and in which said methyl-vinyl ether is mixed with ethanol during contact therewith.

JOHN W. COPENHAVER.
DONALD E. SARGENT.

REFERENCES CITED

The following references are of record in the file of this patent:

UNITED STATES PATENTS

| Number | Name | Date |
|---|---|---|
| 2,218,640 | Fredrichren et al. | Oct. 22, 1940 |
| 2,224,914 | Hill et al. | Dec. 17, 1940 |
| 2,310,809 | Reppe et al. | Feb. 9, 1943 |
| 2,337,059 | Mikeska et al. | Dec. 21, 1943 |
| 2,426,450 | Hale | Aug. 26, 1947 |

OTHER REFERENCES

Egloff et al., Chem. Rev., vol. 36, 111–117 (1945).
Kambara, Jour. Soc. Chem. Ind., Japan, vol. 23, 262B–263B (1940).